United States Patent
Cotter

(10) Patent No.: US 7,376,138 B1
(45) Date of Patent: May 20, 2008

(54) OPTICAL COMMUNICATIONS NETWORK

(75) Inventor: David Cotter, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/958,880

(22) PCT Filed: May 5, 2000

(86) PCT No.: PCT/GB00/01743

§ 371 (c)(1),
(2), (4) Date: Oct. 17, 2001

(87) PCT Pub. No.: WO00/69125

PCT Pub. Date: Nov. 16, 2000

(30) Foreign Application Priority Data

| May 11, 1999 | (EP) | 99303679 |
| Aug. 12, 1999 | (GB) | 9919095.1 |
| Dec. 22, 1999 | (GB) | 9930373.7 |

(51) Int. Cl.
H04L 12/28 (2006.01)

(52) U.S. Cl. .............. 370/403; 370/119; 370/223; 370/349; 370/406

(58) Field of Classification Search ........... 370/85, 370/85.15, 16.1, 223, 406, 349, 222, 119
See application file for complete search history.

(56) References Cited

U.S. PATENT DOCUMENTS

| 5,008,663 | A | * | 4/1991 | Adams | 340/825.5 |
| 5,150,356 | A | * | 9/1992 | Tsutsui | 370/223 |
| 5,159,595 | A | * | 10/1992 | Flanagan et al. | 370/224 |
| 5,216,670 | A | | 6/1993 | Ofek et al. | |
| 5,341,364 | A | * | 8/1994 | Marra et al. | 370/223 |
| 5,406,401 | A | * | 4/1995 | Kremer | 398/4 |
| 5,491,696 | A | * | 2/1996 | Nishimura | 370/225 |
| 5,517,489 | A | * | 5/1996 | Ogura | 370/223 |
| 5,717,689 | A | * | 2/1998 | Ayanoglu | 370/349 |
| 5,721,727 | A | * | 2/1998 | Ashi et al. | 370/244 |
| 5,903,370 | A | | 5/1999 | Johnson | 398/4 |
| 6,021,112 | A | * | 2/2000 | Sugawara | 370/222 |
| 6,532,088 | B1 | * | 3/2003 | Dantu et al. | 398/43 |
| 6,542,511 | B1 | * | 4/2003 | Livermore et al. | 370/406 |
| 6,639,896 | B1 | * | 10/2003 | Goode et al. | 370/224 |
| 6,657,952 | B1 | * | 12/2003 | Shiragaki et al. | 370/223 |
| 6,885,670 | B1 | * | 4/2005 | Regula | 370/401 |

(Continued)

FOREIGN PATENT DOCUMENTS

EP 0 405 756 1/1991

(Continued)

OTHER PUBLICATIONS

PCT International Preliminary Examination Report.

(Continued)

Primary Examiner—Edan Orgad
Assistant Examiner—Andrew C. Lee
(74) Attorney, Agent, or Firm—Nixon & Vanderhye, P.C.

(57) ABSTRACT

In a communications network, a node receives a transit packet. The priority assigned to the transit packet is determined and when it has a low priority then the transit packet is removed and a higher priority packet is inserted in the resulting vacancy.

12 Claims, 19 Drawing Sheets

U.S. PATENT DOCUMENTS

| | | | |
|---|---|---|---|
| 6,952,396 B1* | 10/2005 | Cottreau et al. | 370/222 |
| 6,952,397 B2* | 10/2005 | Mor et al. | 370/223 |
| 6,992,975 B1* | 1/2006 | Daniel et al. | 370/222 |
| 7,054,951 B1* | 5/2006 | Kao et al. | 709/242 |
| 2003/0152105 A1* | 8/2003 | Arimilli | 370/468 |
| 2004/0252688 A1* | 12/2004 | May et al. | 370/389 |

FOREIGN PATENT DOCUMENTS

| | | |
|---|---|---|
| EP | 0 462 349 | 12/1991 |
| EP | 0 687 370 | 7/1997 |

OTHER PUBLICATIONS

Sauer, J. R. et al., "A Soliton Ring Network", Journal of Lightwave Technology, vol. 11, No. 12, Dec. 1, 1993 (pp. 2182-2190).

"Dynamic Transport Technology and Applicants", Cisco Systems, [Online], Retrieved from the Internet: <URL:http://www.disco.com/warp/public/cc/techno/media/wan/sonet/dpt/dpta_wp.htm>, Feb. 1999, pp. 1-17.

PCT International Preliminary Examination Report, May 5, 2000.

* cited by examiner

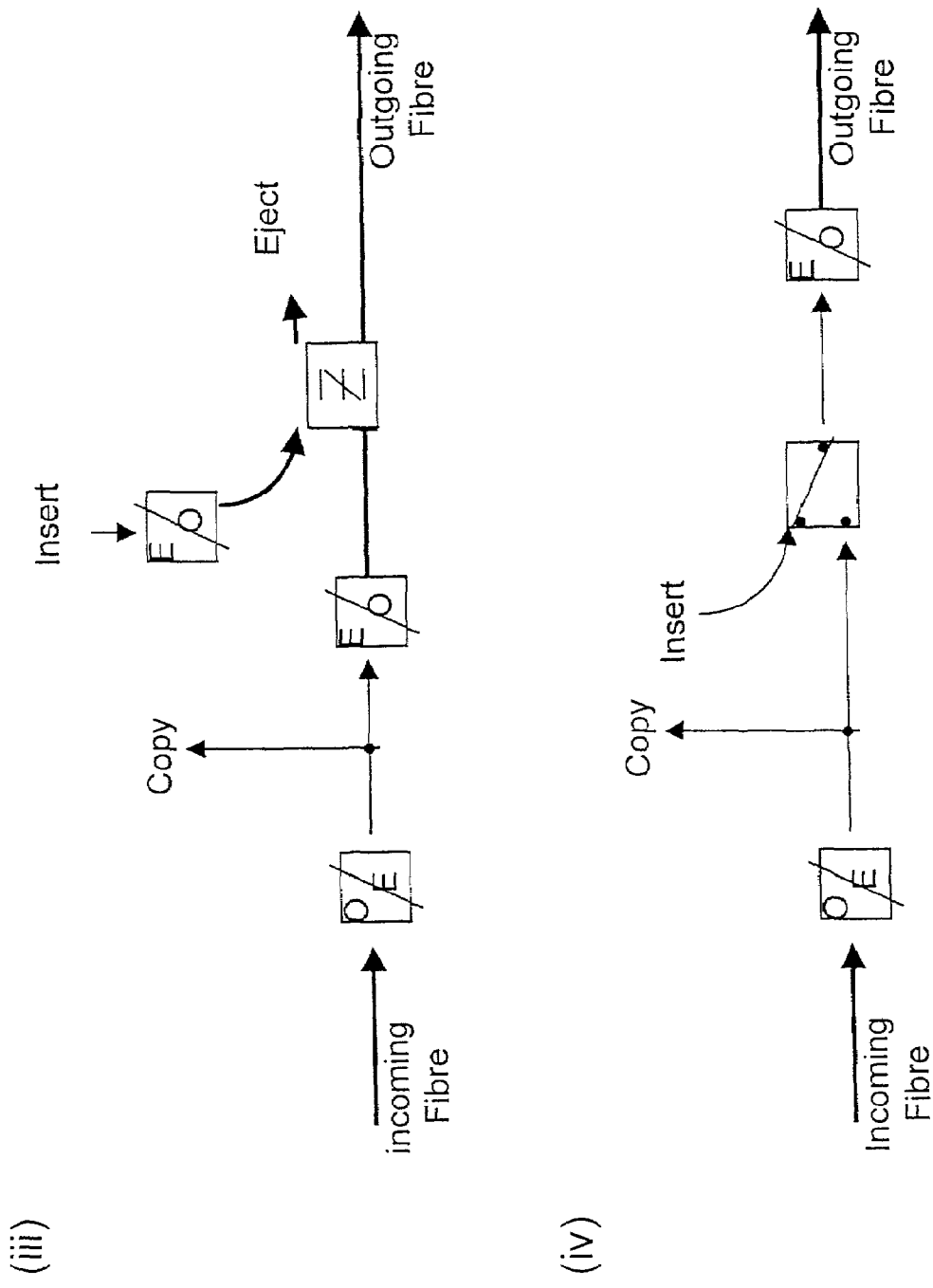
Figure 7(iii), 7(iv)

B = received packet or lo-priority transit packet
D = packet from transmit queue or lo-priority transit buffer

OPTICAL COMMUNICATIONS NETWORK

BACKGROUND

1. Technical Field

The present invention relates to a communications network, and in particular to a packet network and to nodes for use in such a network.

2. Related Art

In some currently proposed architectures for optical networks carrying packet traffic, packets are assigned different priorities in order, for example, to support different quality of service (QoS) levels. Packets originating at a node may be assigned to one of a number of different transmit queues, depending on their relative priority. In some previously proposed "drop and insert" node architectures, when a packet arrives at a destination node, it is removed from the network, and the resulting vacancy may be immediately filled by an outgoing packet from a transmit queue. Such an arrangement is disclosed, for example, in the paper by J. R. Sauer et al "A Soliton Ring Network" Journal of Lightweight Technology, Vol. 11, No. 12, December 1993, Pages 2182-2190.

BRIEF SUMMARY

According to a first aspect of the present exemplary embodiment, there is provided a method of operating a node in a communications network, the method comprising:

(a) receiving a transit packet at the node,
(b) determining a priority assigned to the transit packet,
(c) when the transit packet is determined to have a relatively lower priority, then removing the said transit packet, and in that case,
(d) outputting from the node in the vacancy created by removing the said packet another packet determined to have a relatively higher priority.

By a "transit packet" is meant a packet handled by a node that does not originate from the node, and is not addressed to the node.

The present exemplary embodiment significantly enhances the effectiveness of packet prioritization schemes in a communications network, by selectively removing lower priority transit packets and replacing them with higher priority packets. The invention is applicable both to slotted networks, and to networks with e.g. variable length packets received asynchronously at the node.

Preferably the node includes a continuous-flow transmission path connecting the input to the node to the output from the node and an alternative path connecting the input to the node to the output from the node and including one or more packet queues, and the method includes outputting a transit packet determined to have a relatively higher priority via the continuous-flow transmission path.

A continuous-flow transmission path is one which transmits packets in a steady, continuous fashion without using queues or other variable delays. The continuous-flow-transmission path may be entirely in the optical domain. Alternatively, part or all of the continuous-flow transmission path may be in the electrical domain. In this case, electrical-optical conversion may be carried out at the input and output of the node.

According to another aspect of the present exemplary embodiment, there is provided a communications system comprising a communications network having a ring topology and comprising at least two duplicate transmission paths, and a plurality of nodes connected to the ring network each node being arranged to output onto the ring network packets addressed to one or more other nodes on the network, and switch means bridging the at least two transmission paths, and arranged, in the event of a failure in one of the transmission paths, to divert packets from the said one of the transmission paths onto the other of the transmission paths, characterised in that each node is assigned a different network address for each of the transmission paths, and in that one or more of the nodes is arranged to remove a packet from the network when the packet carries the node address corresponding to the transmission path on which the packet was received.

One advantage of the dual ring packet network is that it offers enhanced resilience. In the event of a failure in one of the rings, "ring wrap" is used to divert packets onto the other of the rings. The present inventor has recognised that it is important that, in the event of ring wrap, that the destination node still recognises packets addressed to it and handles packets in the normal way, but that at the same time it is necessary that control processors at the nodes should be aware that ring wrap has occurred. This aspect of the invention makes this possible, while imposing minimal signalling or processing overheads. Suppose a node has the address A on the outer ring and address B on the inner ring. The node will eject any packet that it finds on the outer ring with ADDRESSEE=A and will eject any packet that it finds on the inner ring with ADDRESSEE=B. A packet with ADDRESSEE=A that is wrapped onto the inner ring will be ejected by the node. Similarly a packet with ADDRESSEE=B that is wrapped onto the outer ring will be ejected by the node. In preferred example this ensures that a multicast packet transmitted from the node in question on the outer ring and created with ADDRESSEE=A will not be prematurely ejected if it is wrapped back onto the inner ring before reaching all the other nodes. Another example is an express control packet used for a TTL (time-to-live) mechanism, where this ensures the packet is not prematurely ejected if there is a ring wrap.

BRIEF DESCRIPTION OF THE DRAWINGS

Systems embodying the present invention will now be described in further detail, by way of example only, with reference to the accompanying drawings, in which:

FIG. 15b shows the format of a packet handled by the node of 15a; and

DETAILED DESCRIPTION OF EXEMPLARY EMBODIMENTS

Figure 1:
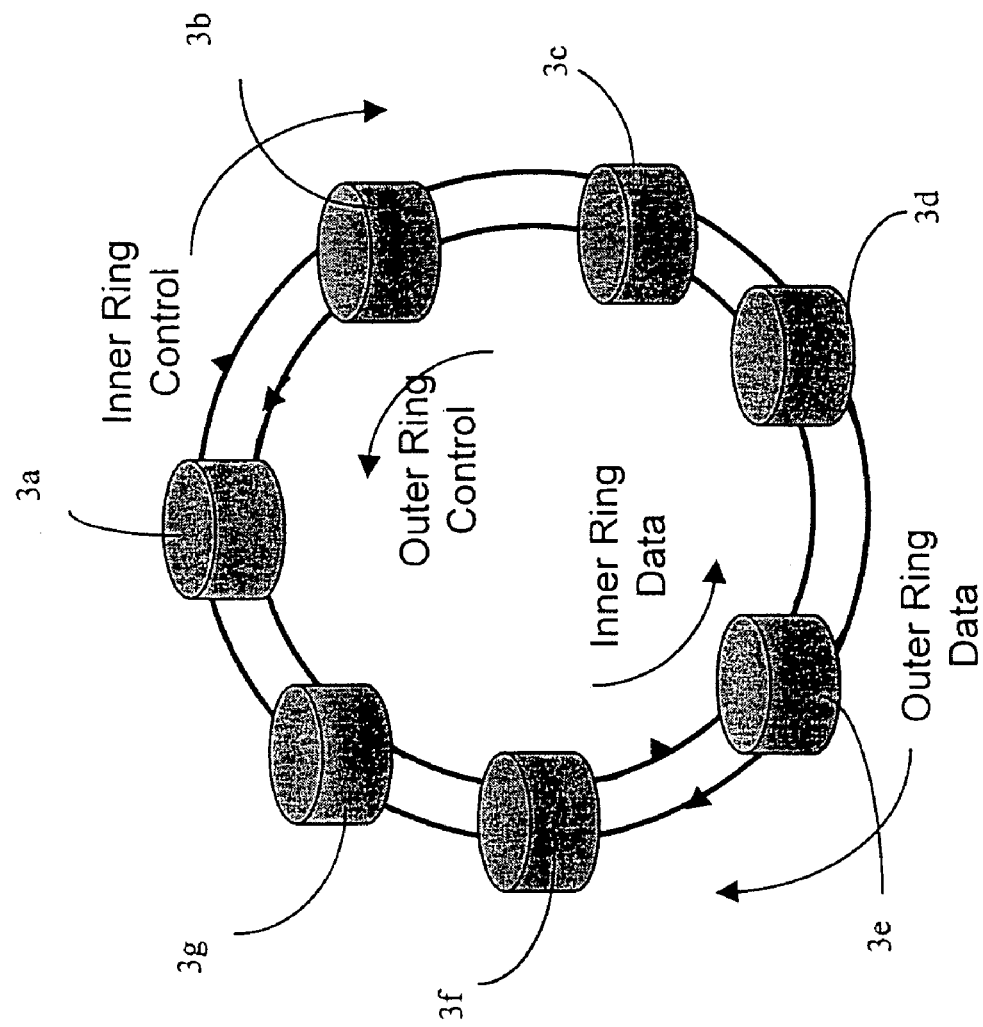
FIG. 1 is a schematic showing a prior art network.

FIG. 1 shows a prior art architecture developed by Cisco and known as the DPT (Dynamic Packet Transport) ring architecture. In this scheme, Internet routers are placed on two concentric counter-directional rings. The rings consist of a sequence of optical fibre links, each of which terminates at the input and output ports of the routers. One of the rings is known as the inner ring and the other as the outer ring. Data packets are sent in one direction and corresponding control packets are sent in the opposite direction on the other fibre. This IP (Internet Protocol) ring network is designed to provide a number of features. In particular, it supports statistical multiplexing of packets with no provision of point-to-point connections or use of dedicated bandwidth for interconnection of routers or for protection. It is also designed to support packet prioritisation and to offer multiple levels of queuing and scheduling and to support both unicast and multicast transmissions. In the network of FIG. 1, by contrast with the network described below with reference to FIG. 2, the signal transmission path is interrupted at each node.

Figure 2:
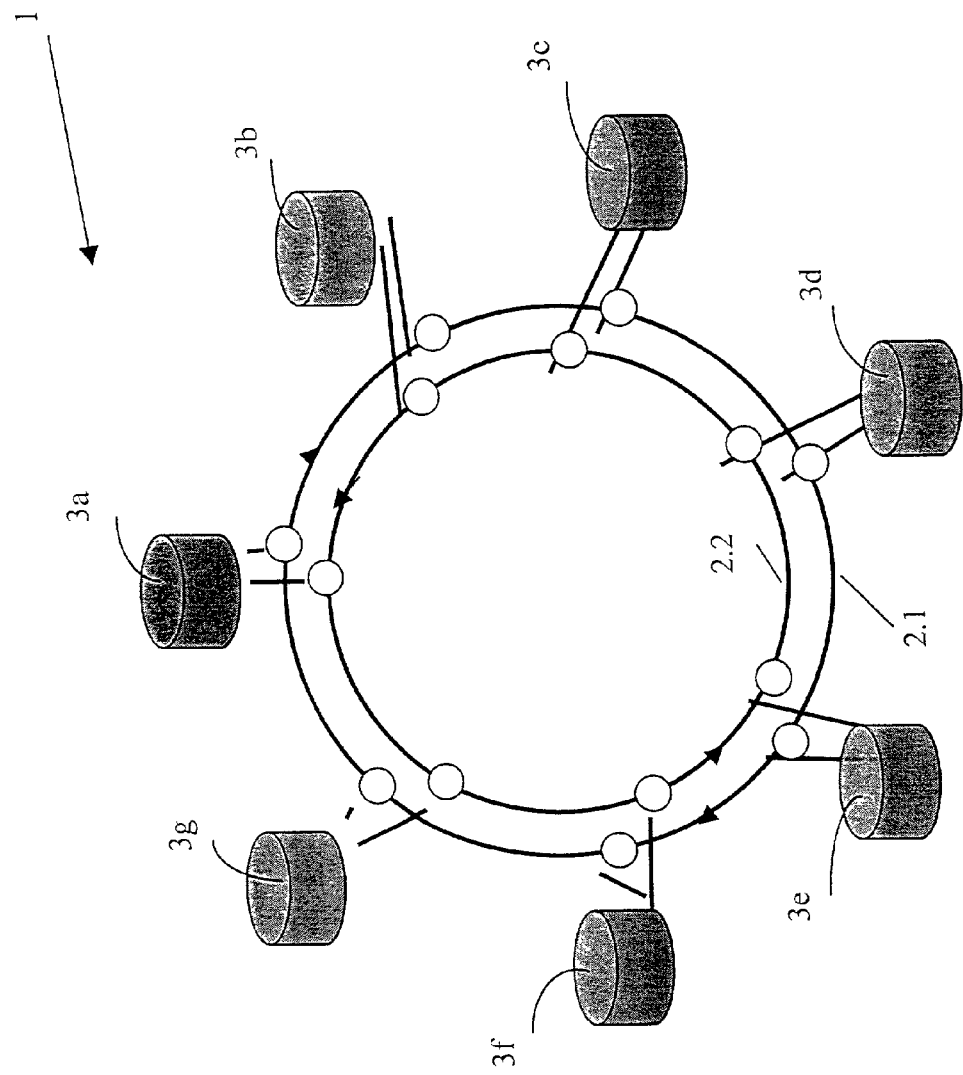
FIG. 2 is a schematic showing a first example of a network embodying the present invention.

FIG. 2 shows a network embodying the present invention. A communications network 1 comprises concentric outer and inner rings 2.1, 2.2. The rings carry optical packets. A number of nodes 3a to 3g are connected to the rings. In this example, each of the nodes 3a to 3g is an Internet Protocol router. In operation, one of the routers, for example 3a, outputs an optical packet addressed to another of the routers, for example 3d, onto one of the dual concentric rings. The optical packet output by node 3a carries the network address of node 3d in an address field in the packet header. The packet passes around the ring. At each intermediate node, the packet address is compared with the address of the respective node. If the packet is not addressed to a given intermediate node, then the packet passes on to the next node, and so on. At the destination node, the address is read and the packet is recognised as being intended for receipt at that node. The packet, in the case of a unicast transmission is removed from the network at that node. It may then, for example, be converted to the electrical domain for onwards transmission to a customer terminal on an electronic network connected to the respective node.

Figure 3:
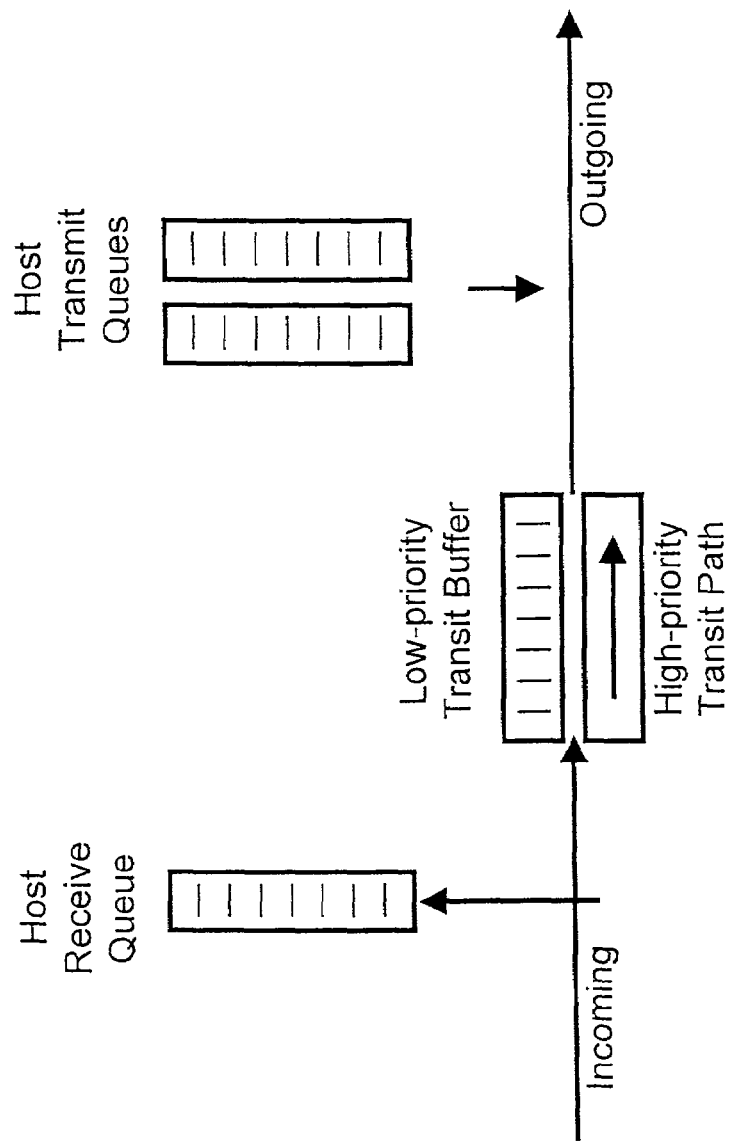
FIG. 3 shows the data flows through a node in the network of FIG. 2.

FIG. 3 shows the flow of received and transmitted data packets at one of the nodes on one of the fibre rings. An incoming data packet is (i) sent to host receive queue (if it has reached its destination) or (ii) is passed over for onward transmission. A multicast packet may both be sent to the host receive queue and also be forwarded for onward transmission. Packets for onward transmission are treated according to their priority: a low-priority packet is passed to a transmit queue. An express high-priority, packet is passed immediately to the outgoing path without queuing. When capacity on the ring allows, a packet from one of the transmit queues may be passed to the outgoing path. Multiple transmit queues may be used to manage prioritisation of outgoing traffic from the node.

In this example, the optical fibre rings and the nodes are configured to provide a continuous optical path for express packets.

In a continuous transmission path signals stream into and out from the path at a continuous and uniform rate. The path may be a continuous optical transmission path. The continuous optical transmission path may contain a substantially fixed delay as in FIG. 3. In the case of a continuous transmission path in the electrical domain the path may contain storage elements such as an FIFO (first-in first-out) buffer. This differs from conventional systems, however, in that, in normal operation, the output from the buffer is continuous and regular, so that the input and output of the buffer occur at substantially the same rate. In conventional prior systems, a buffer is used to hold transit packets in a queue which is serviced at rates and/or times which are dependent on factors such as packet priorities, queue length, status of contending queues etc.

A further function carried out by the control circuits is to determine whether the time-to-live (TTL) of a packet has expired. If the time-to-live is determined to have expired, then again a control signal is sent to the switch to cause such a packet to be ejected from the onwards transmission path. When one of the nodes generates and outputs an optical packet onto the ring, a value is written in a phase field "PH" in the packet header. One of the nodes functions as a master node. The master node outputs multicast express control packets that travel around each ring to inform each node of the current phase value. The phase value is regularly updated, at a rate of at least once per round-trip time for speed-of-light travel around the ring. The updating of the phase value is carried out by the master node incrementing the value, for example, in the case of one control packet per round trip of the ring, the phase value is incremented by 1 (modulo 3). Each ring periodically receives and stores the current phase value as indicated by one of the multicast express control packets from the master node. When any other express packet is received at the node the control logic in the node determines whether the value in the PH field of the received express packet differs from the current phase value by an amount sufficient to indicate that the packet is expired. For example, in the case of one control packet per round trip, the node determines whether the value in the PH field of the received packet is such that:

$$(\text{current\_phase} - PH) \bmod 3 > 1$$

If this inequality is satisfied, then the packet is expired and should be purged from the ring. This may be the case, for example, because the packet is addressed to a node which is currently malfunctioning or because there is an error in the address of the packet.

Figure 4:
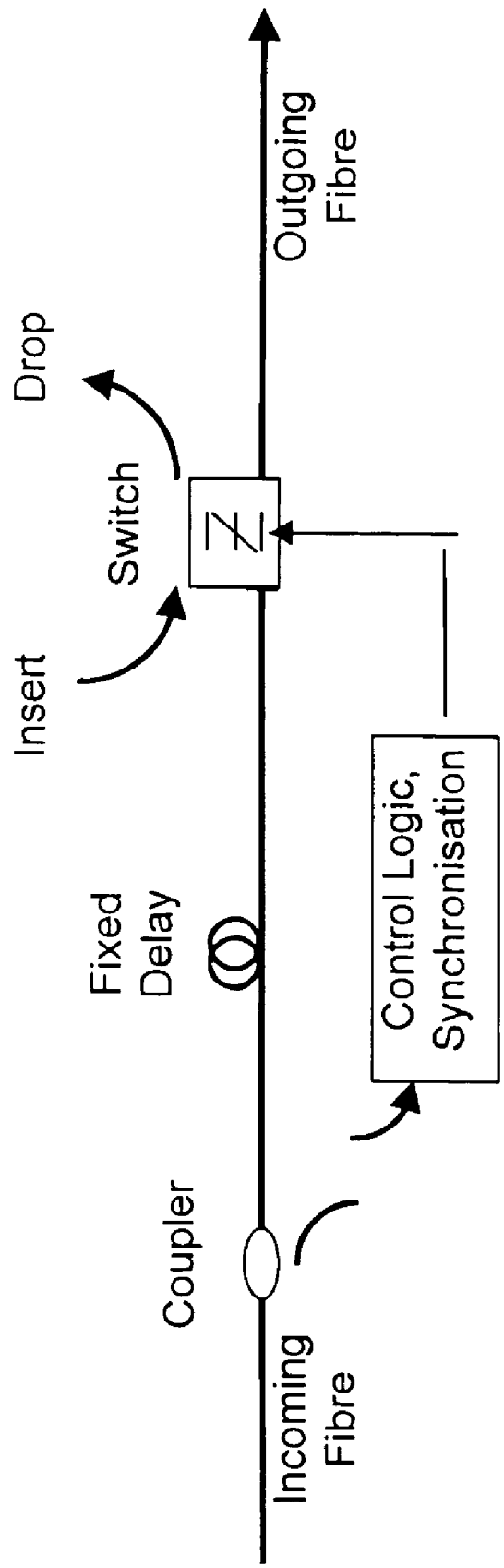
FIG. 4 is a schematic showing the architecture of a prior art node.

FIG. 4 shows the traditional 'drop-and-insert' (D&I) architecture that has been widely considered previously for optical packet networks (e.g. J R Sauer, M N Islam and S P Dijaili, "A soliton ring network", Journal of Lightwave Technology, vol. 11, no. 12, December 1993, pp. 2182-2190). The node contains a 2×2 optical crossbar switch. When the switch is in the bar (straight-through) position: (i) an optical packet on the incoming fibre is 'dropped' (i.e. switched to the node receiver); or (ii) an optical packet created by the host transmitter is 'inserted' (i.e. switched to the outgoing fibre); or both (i) and (ii) occur simultaneously. A limitation of the D&I node architecture is that when a packet is received by the node it is physically removed from the optical path between the incoming and outgoing fibres. The only method for multicasting a packet is, at each node, to drop the packet and then subsequently reinsert it when sufficient vacant capacity on the ring becomes available. Therefore this architecture cannot support multicasting of express (high-priority) transit packets.

Figure 5:
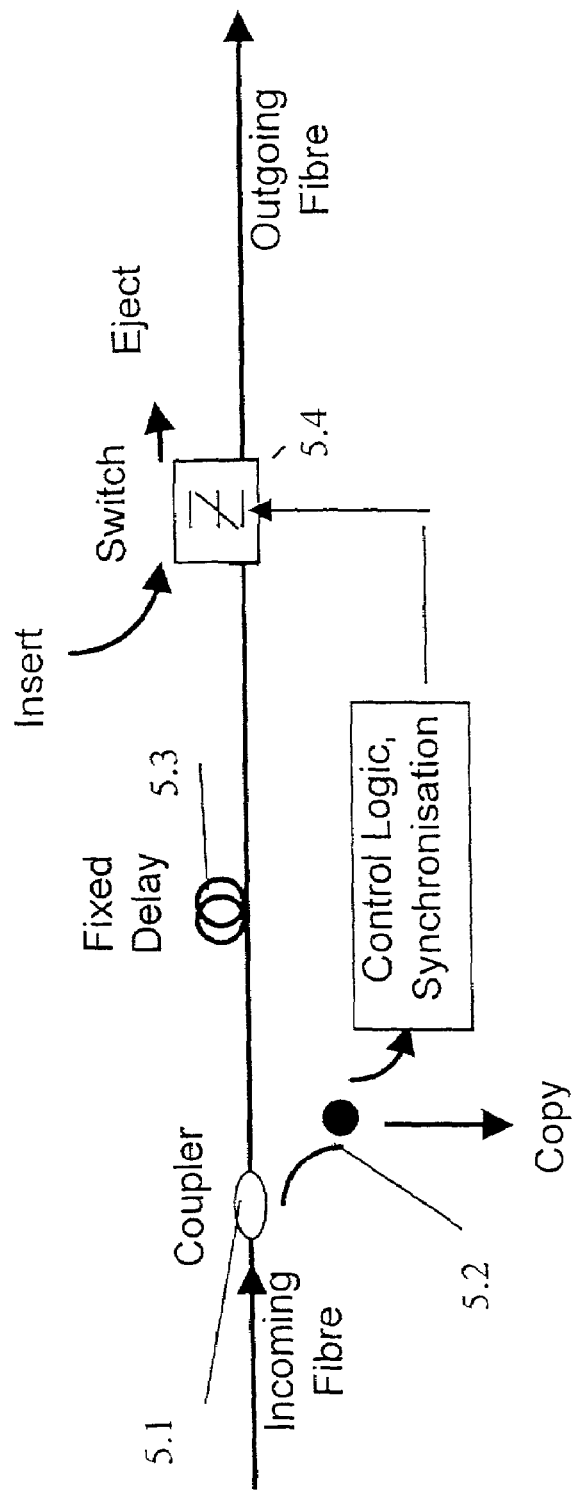
FIG. 5 is a schematic showing the architecture of a node embodying the present invention.

FIG. 5 shows a preferred form of the new node architecture that we have invented. Instead of 'drop-and-insert' (D&I), this new architecture provides the function of 'copy-eject-and-insert' (CEI). In the case of a D&I node, packets are extracted from the transmission path for the purpose of receiving them at a node. In the case of a CEI node, packets are copied but not extracted from the transmission path for the purpose of receiving them at a node. All incoming traffic is copied to the node, for example by means of a passive optical coupler as shown in FIG. 5. In use, an incoming fibre from one of the optical rings passes to a coupler 5.1. From the coupler 5.1, one optical path passes through a further length of fibre 5.3 providing a fixed delay to an optical crossbar switch 5.4. An outgoing fibre connected in the fibre ring passes from one of the output ports of the crossbar switch. The other output from the coupler 5.1 is split again, for example, using a further coupler 5.2. One branch of the output from this further coupler is used to provide a copy of the optical packet on the incoming fibre. This copy may be passed, for example, to the hose receive queue. The other branch of the output of the further coupler passes to control circuits. These control circuits may, for example, read a header carried with the optical packet, and carry out associated logic operations. A control output is generated by the control circuits and passes to the crossbar switch. If the control circuits determine that the packet is addressed to the respective node, then the crossbar switch is set to the cross state in order to eject the packet (in the case of unicast transmission). If an incoming packet has reached its destination or is otherwise intended to terminate at the node, the packet is also ejected from the ring, for example by means of the crossbar switch as shown in FIG. 5. Simultaneously, or whenever sufficient vacant capacity on the ring becomes available, a packet may be inserted onto the ring by the node. The control logic and synchronization sub-systems use information contained in the packet (for example in the packet header) and other information (for example the filling status of transmit queues and the status of control flags) to operate the crossbar switch. FIG. 5 shows a fixed optical delay, which allows sufficient time for the operation of these control logic, synchronization sub-systems and switch before the arrival of the packet at the switch. As in the D&I architecture, an express (high priority) transit packet is passed directly to the outgoing fibre. However, unlike D&I, the CEI architecture allows express transit packets to the multicast, because they are simultaneously copied without delaying their onward passage.

Figure 14:
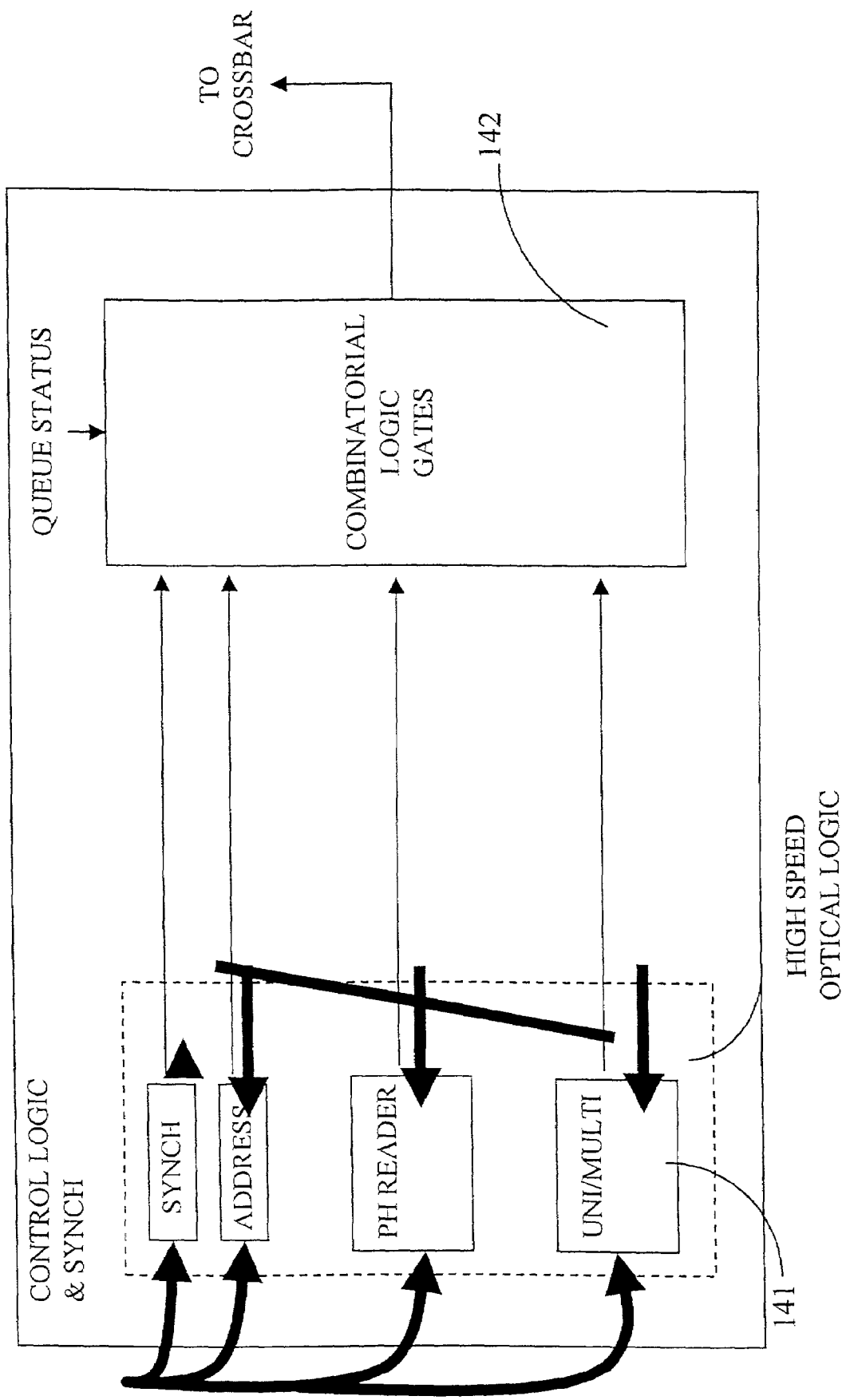
FIG. 14 shows logic and synchronisation circuits

FIG. 14 shows the control logic subsystem in more detail. It includes optical logic stages 141 and combinatorial electronic logic gates 142. The four optical blocks (synch, address recognition PH reader and Unicast/Multicast) each have copies of the optical packet to the input. The output from the synchronisation block is an optical path to each of the other three optical blocks. The synch block may be based on one of the self-synchronisation techniques we have described in our patent EP-B-687370 (e.g. using pulses separated by 1.5 bit periods input to an optical AND gate). The address recognition block may be based on the technique we have described before in that patent. Addresses are coded using specially selected binary words, and recognised by inputting address and target word to an optical AND gate. The output from the AND gate is converted to give an output from the block that is an electrical binary signal that says packet ADDRESSEE matches/does not match local address. The PH may be two optical AND gates, each having the optical packet as one input and a synch pulse as the other input—this synch pulse timed to overlap with one of the PH bits. The output from PH reader block is two parallel electrical binary signals—each denoting one of the PH bits. The UNI/MULTI reader may be one optical AND gate, having the optical packet as one input and a synch pulse as the other input—this synch pulse timed to overlap with the UM bit. The output from UNI/MULTI reader block is one electrical binary signal—denoting unicast/multicast. These electrical signals, together with signals from the queue status then pass to the high-speed electronic logic part. This part performs the logic which is set out in—the table below describing the action of the node for various types of packet (e.g. multicast low-priority transit packet, etc). The output from this electronic logic is a binary electrical signal to set the 2×2 cross bar optical switch configuration.

Each stage of this logic has to operate within a time shorter than the shortest packet. e.g. for a 50 byte packet at 100 Gbit/s=4 ns. Since the optical stage and electronic logic stage are arranged in pipeline, each stage would have to take less than the minimum time (e.g. 4 ns). The optical stage is ultrafast—e.g. using four-wave mixing in semiconductor optical amplifier, or TOAD device, etc. to implement the optical AND gate. Since the electronic logic required is simple it is possible to construct suitable fast circuit using hard-wired combinatorial logic.

Figure 16A:
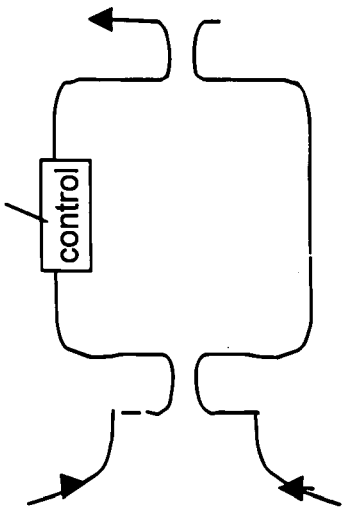
FIGS. 16a to 16e show crossbar switch structures.

FIG. 16a shows the design of a simple crossbar switch. This includes a region 161 of lithium niobate. When an electrical control signal is applied to a gate on the lithium niobate, then the refractive index of the lithium niobate changes, so that the optical signal is coupled across from one optical path to the other, the "cross" state of the switch.

Figure 16B:
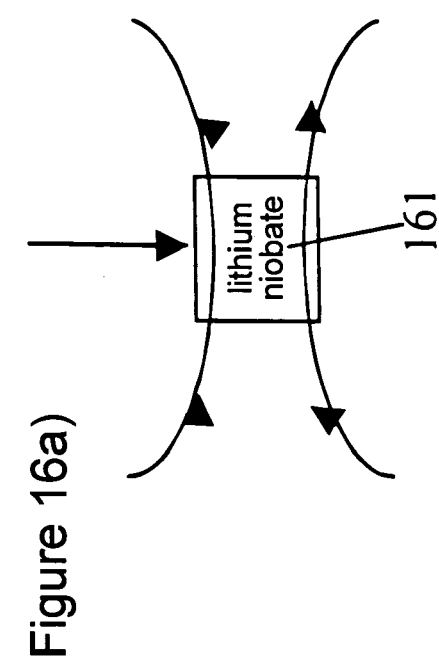

FIG. 16b shows an alternative design for a crossbar switch. In this case, the switch uses a Mach Zehnder interferometer configuration with a control element 162 in one branch of the interferometer. A phase change is generated by the control element 162 when the control signal is applied, to switch the output from one optical output port to the other. Both of these designs suffer significant cross talk: that is, when an optical signal is switched to one of the ports, a significant level of optical power, for example 20 or 30 percent of the input power, is present at the other output port.

Figure 16C:
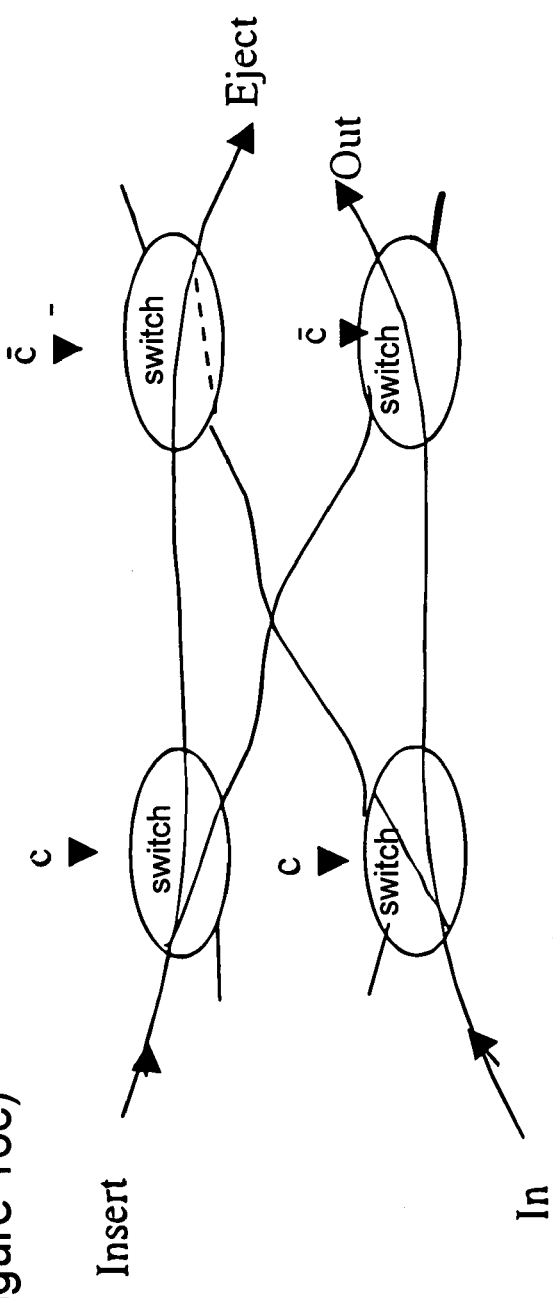
Figure 16D:
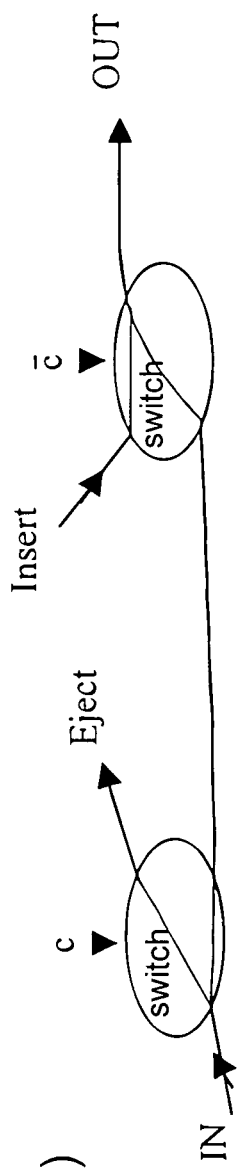

To overcome this problem, each crossbar switch in the nodes described above may be replaced by a network of four such switches in the configuration shown in FIG. 16c. The switches are cross-connected as shown. The control signal c is applied to the first pair of switches in the signal path, and the logical compliment of the control signal, c̄ is applied to each of the second pair of switches in the signal path. Logically, the switching effect of such a network is equivalent to that of each the single switches of FIG. 16a or 16b. However, the crosstalk is reduced by an order of magnitude. Since the crossbar switch required only two inputs, one for the insert path and one for the straight through path, and only two outputs, one for the eject path and one for the output path, it can be shown that the full network shown in figure c is not required. Instead, the full crossbar switching function with the benefit of crosstalk reduction can be achieved using a pair of cross bar switches connected in series as shown in FIG. 16d.

Figure 16E:
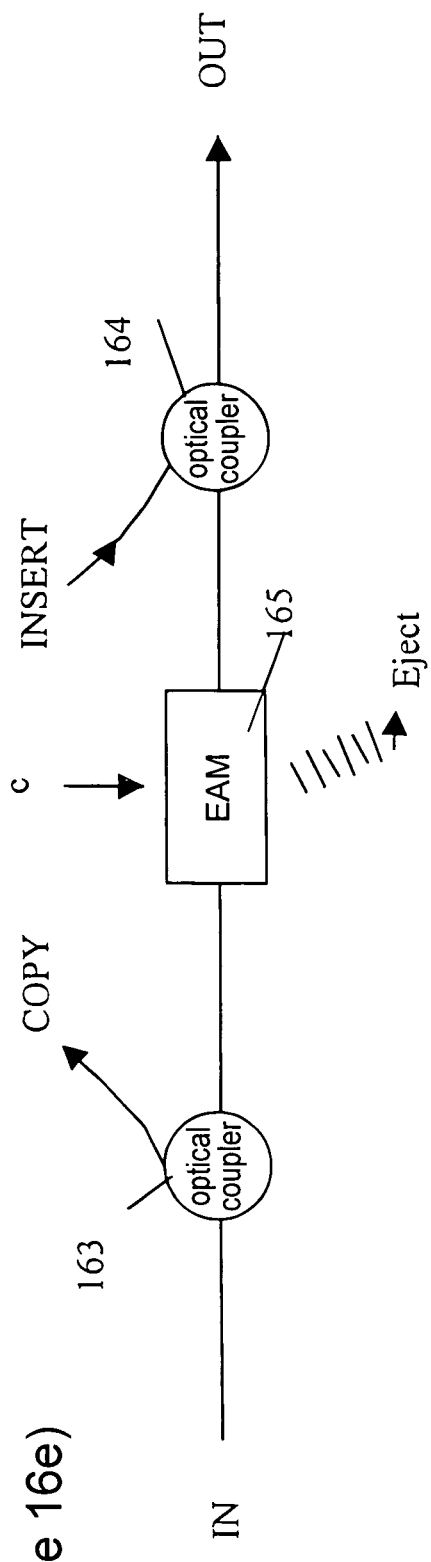

FIG. 16e shows a further alternative design also offering improved cross talk performance. This uses a pair of passive optical couplers 163, 164 with an electro-absorption modulator (EAM) 165 connected between them. The copy optical signal is taken from the first of the optical couplers 163 and the insert optical signal is added at the second of the optical couplers 164. In the absence of a control signal c, the EAM 165 is in its transparent state and the optical packet passes straight through from the input path to the output path. When a packet is to be ejected then the control signal c switches on the EAM 165. The ejected packet may then be replaced by further packet added on the INSERT optical path of the coupler 164.

Figure 6:
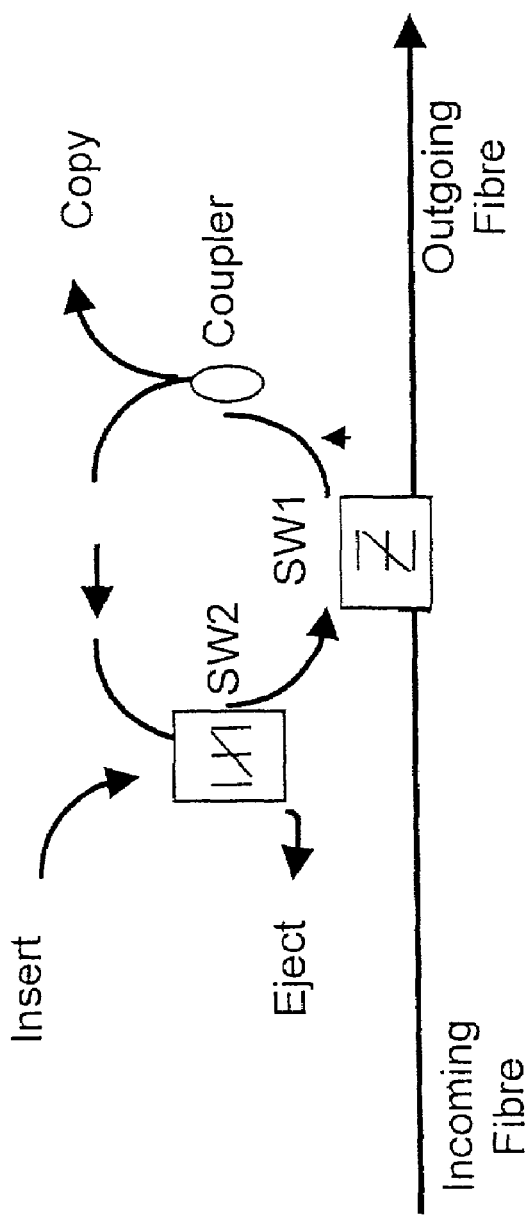
FIG. 6 is a schematic showing alternative node architecture.

FIG. 6 shows an example of the CEI architecture in an alternative form. Here there are two crossbar switches, SW1 and SW2. (For clarity, the control logic and synchronisation sub-systems are not shown.) In this case not all incoming packets are copied; instead only those that arrive whilst SW1 is in the cross state will be copied. In this case an express multicast packet may be copied and immediately reinserted onto the ring if switches SW1 and SW2 are both placed in the cross state. However in this case the express multicast packet is delayed by the transit time of the feedback loop from SW1 to SW2 and back again to SW1. The alternative form of the CEI architecture shown in FIG. 6 has certain drawbacks: First, the forced additional delay for express multicast packets increases the probability of contention at SW1 (described further below) unless special preventative measures are used (such as, for example, providing a sufficient time guard band following an express multicast packet, with the resulting penalty of reduced network throughput and higher complexity). Second, the architecture shown in FIG. 6 requires two optical switches, rather than one.

In the case of the D&I architecture (FIG. 4), the extraction of packets from the transmission path for the purpose of receiving them at a node is necessarily a selective process in the optical domain, and may be performed for example by an optical crossbar switch. In the preferred form of the CEI architecture (FIG. 5), the copying of packets from the transmission path for the purpose of receiving them at a node is non-selective in the optical domain, and may be performed for example by a passive optical coupler.

Figures 7, 7I:
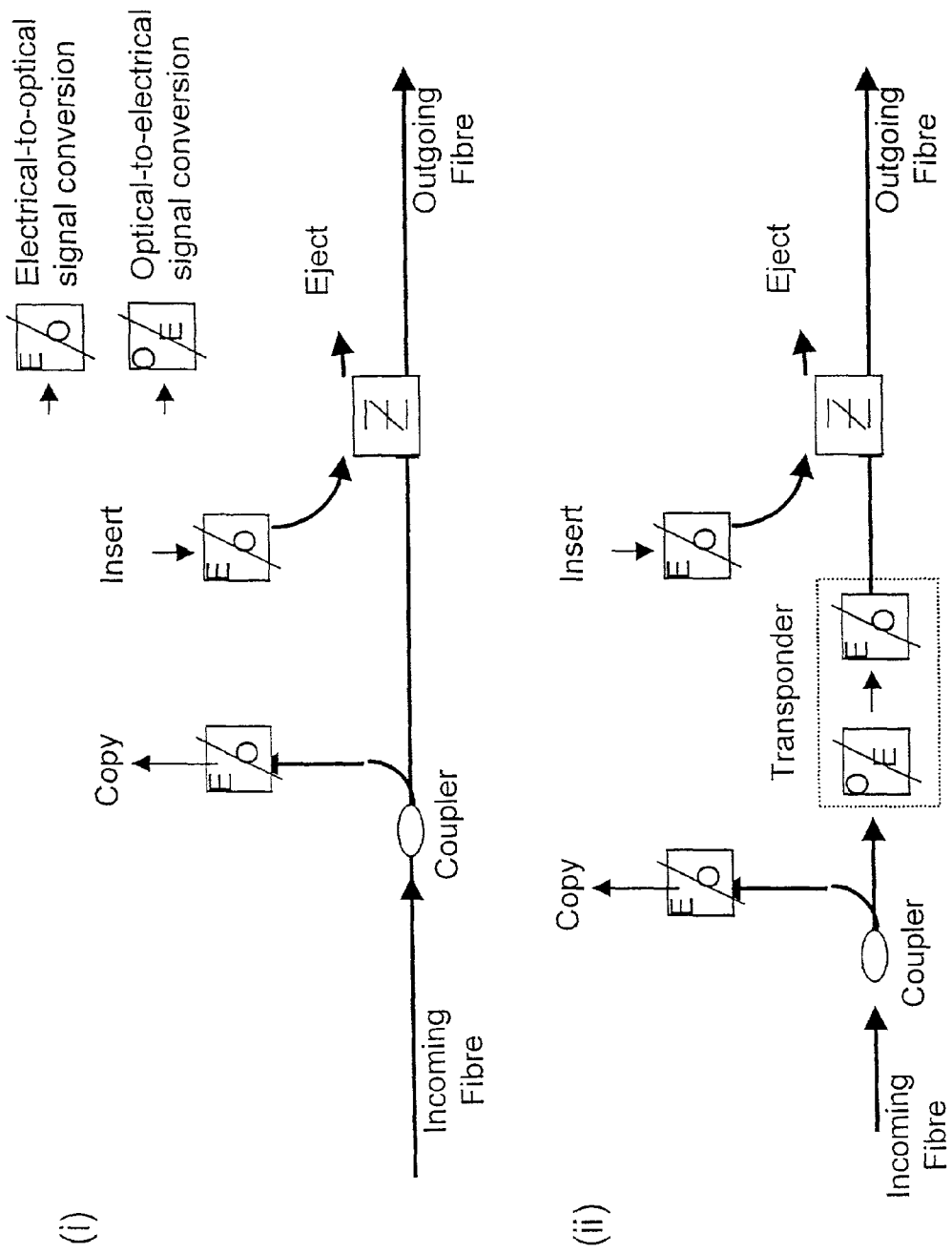
FIGS. 7*i* to 7*iv* show alternative configurations for the node of FIG. 5.

In the CEI architecture the continuous transmission path for express transit packets is preferably a continuous optical transmission path, but not necessarily so, as shown in FIGS. 7(*i*)-(iv). FIG. 7(*i*) shows a preferred arrangement with a continuous optical transmission path for express transit packets. FIG. 7(*ii*) shows a transponder (a regenerator using optical-electrical and electrical-optical conversion stages). FIG. 7(*iii*) shows a case where the copy function is performed in the electrical domain. FIG. 7(*iv*) shows a case where the copy, eject and insert functions are all performed in the electrical domain. In this case the switch can be a 1×2 electrical switch, and as in the case of optical switching, the channel left open circuit is in effect 'ejected'.

FIG. 7(*iv*) is distinguished from conventional nodes by a 'continuous transmission path'. In the continuous transmission path signals stream into and out from the path at a continuous and uniform rate.

Figure 8:
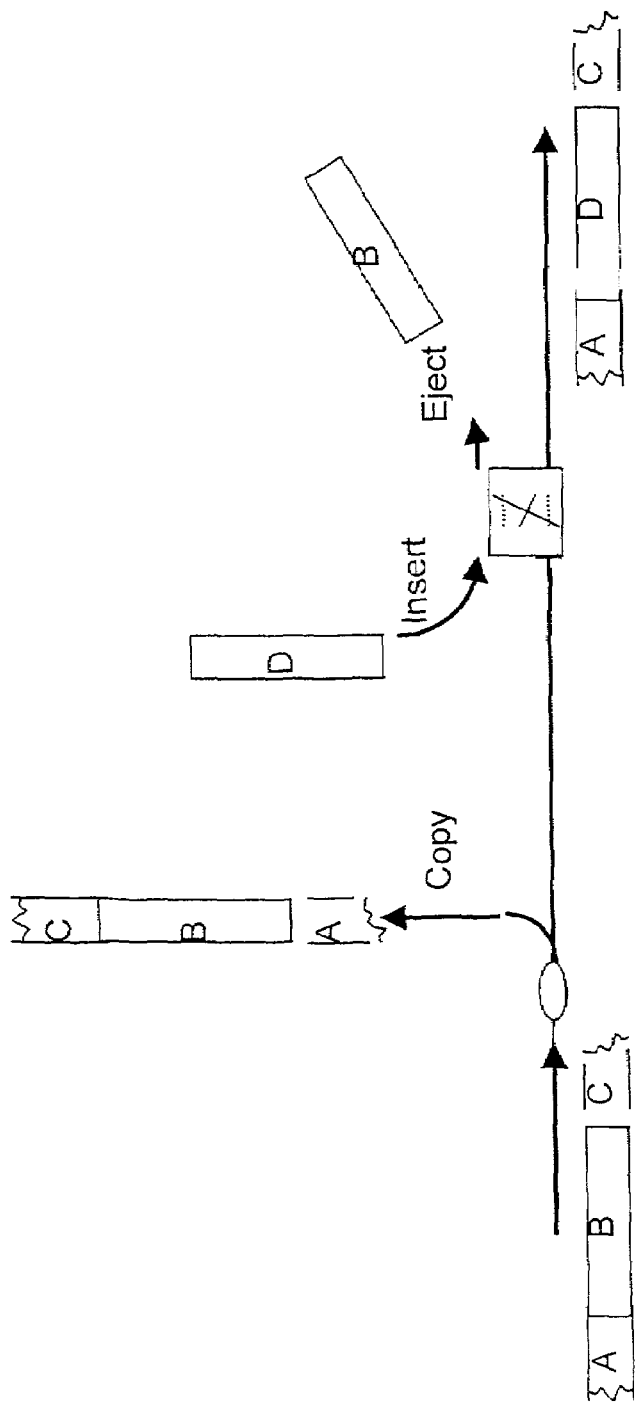
FIG. 8 illustrates the substitution of a high priority packet for a low priority packet.

An important feature of an optical packet network with different priority classes is the ability to reallocate the time occupied on the ring by a transit packet to another packet with higher priority. The reuse of certain time slots using a D&I optical node architecture is previously known. For example, the previously cited paper of Sauer et al describes a D&I optical node in which a slot made vacant by dropping a packet (i.e. removing from the optical ring a packet when the packet destination address matches the node address) can be immediately reused by inserting a transmit packet. Here, distinctively, we reallocate any time-position by ejecting an incoming packet from the ring so as to vacate the time position, and immediately or simultaneously insert into the same time position another packet taken from one of the transit or transmit queues. Using the CEI architecture, the steps required to reallocate to a packet of higher priority a time slot currently occupied by an incoming transit packet are: copy the incoming transit packet; determine its priority; if appropriate for reallocation, then do {eject the packet from the ring; deliver the packet copy to the transit buffer; transmit another packet of higher priority reusing the same time position}. This is illustrated in FIG. 8. Notice that the CEI architecture is not essential for this process. For example, using a D&I architecture the steps required would be: determine the priority of an incoming transit packet; if appropriate for reallocation, then do {drop the packet; store the packet for later transmission; and transmit another packet of higher priority reusing the same time position}.

Figure 9:
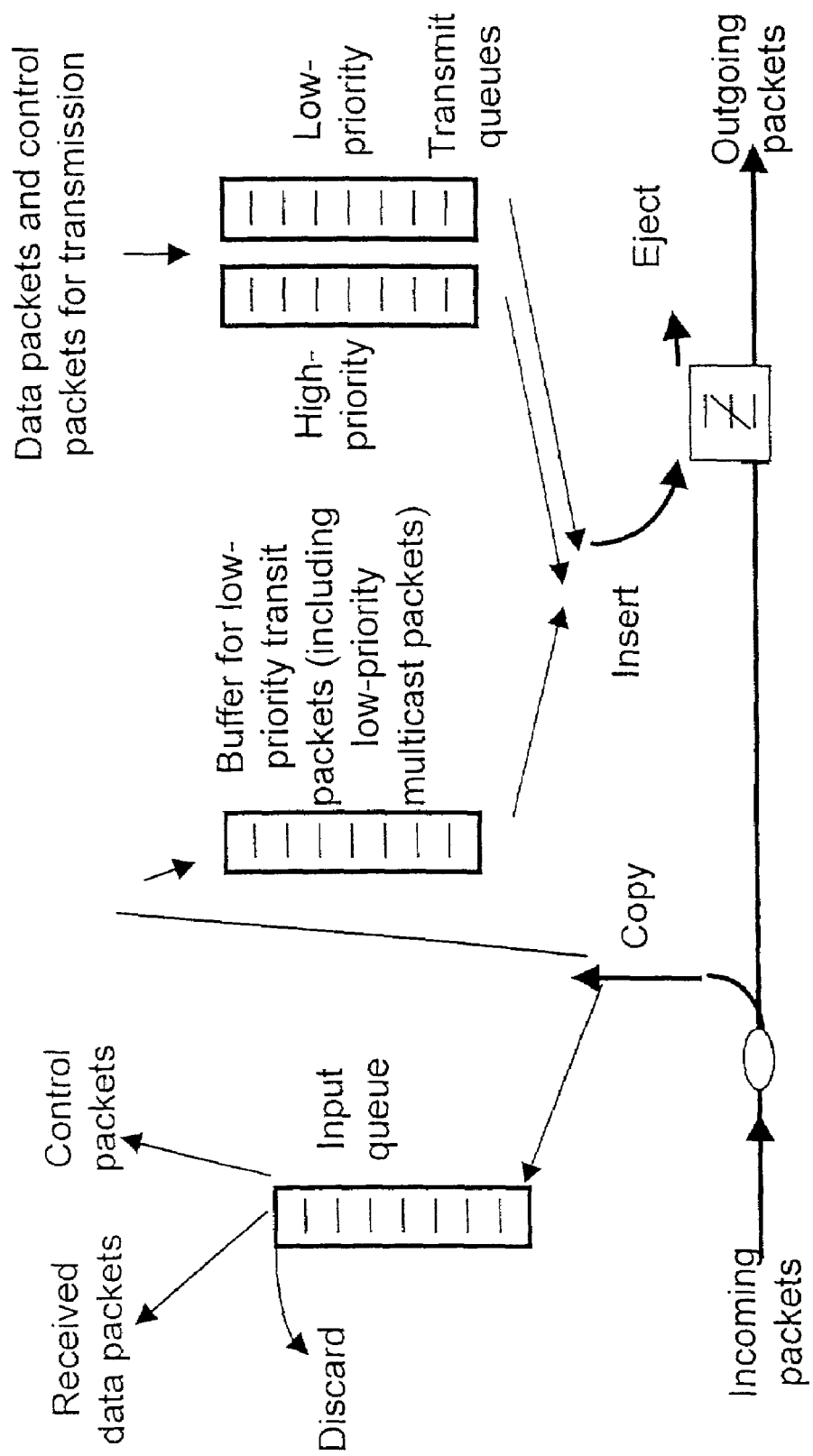
FIG. 9 shows packet queues within a node for different packet types.

FIG. 9 shows the flow of incoming and outgoing packets in the optical CEI node of FIG. 5, so as to realise the architecture of FIG. 3. All packets are assumed to be in one of two priority classes: low and high (express). Packets may also be unicast or multicast, and they may be data packets (with a payload of user data) or control packets (uniquely for network control purposes). All incoming packets are copied, whereupon they may be allocated to various input queues or else discarded. The operations at the node to handle different types of legitimate (e.g. non-expired) incoming packet are as follows:

Unicast

Express transit packet: The crossbar switch is put in the bar (straight through) state so that the packet is passed directly to the outgoing fibre. The packet copy is discarded.

Express racket addressed to node: The crossbar switch is put in the cross state to eject the packet from the ring. The packet copy is delivered to the input queue, and subsequently sorted according to whether it is a data or control packet.

Low-priority transit packet: The crossbar switch is put in the cross state to eject the packet from the ring. The packet copy is delivered to the low-priority transit buffer.

Low-priority packet addressed to node: The crossbar switch is put in the cross state to eject the packet from the ring. The packet copy is delivered to the input queue, and is subsequently sorted according to whether it is a data or control packet.

Multicast

Express packet (different source): The crossbar switch is put in the bar state so that the packet is passed directly to the outgoing fibre. The packet copy is delivered to the input queue, and is subsequently sorted according to whether it is a data or control packet intended for delivery to the node, otherwise it is discarded.

Express packet (node is the source): The crossbar switch is put in the cross state to eject the packet from the ring. The packet copy is discarded.

Low-priority packet (different source): The crossbar switch is put in the cross state to eject the packet from the ring. The packet copy is delivered to low-priority transit buffer. The packet copy is also delivered to the input queue, where it is subsequently sorted according to whether it is a data or control packet intended for delivery to the node, otherwise it is discarded.

Low-priority packet (node is the source): The crossbar switch is put in the cross state to eject the packet from the ring. The packet copy is discarded.

Packets for transmission from the node are selected from the low-priority transit buffer or the transmit queues according to the current status of queue depths, appropriate rate controls, fairness algorithm, etc. Subject to these controls, packets are transmitted as vacant capacity becomes available on the ring (either vacant capacity on the incoming fibre or new vacant capacity created by the ejection of packets from the ring by the node itself).

Figure 10:
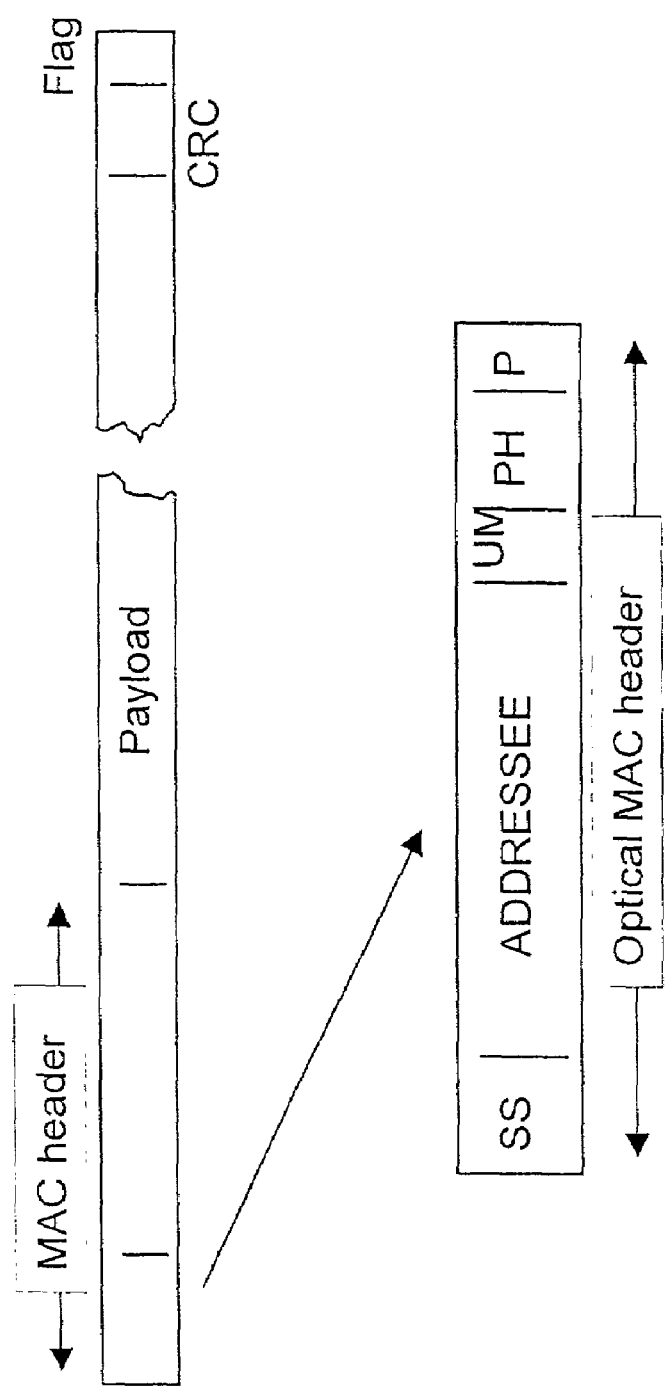
FIG. 10 shows the format of an optical packet.

Each packet carries an appropriate MAC protocol header, designed according to the principles set out earlier (FIG. 10 shows a suggested example). This MAC header can consist of two parts: one part (which we call the 'optical MAC header') contains the minimum information needed for the processing functions that must be carried out at high speed 'on the fly' to enable the operations listed above. The second part of the MAC header contains information needed for other Layer 2 functions.

In the example shown in FIG. 10, SS (self-synchronisation) is a 2-bit field used for timing recovery. ADDRESSEE is a 10-bit field used to indicate which node should strip the packet from the ring. In the 'Spatial Reuse Protocol' (SRP) described by Cisco (part of the Dynamic Packet Transport), packets are stripped from the ring by the destination node in the case of unicast packets. It is proposed here that for the purpose of routing in the high-speed network, the optical MAC header will not include both the source and destination addresses, but instead will contain a single address field ADDRESSEE. For the transmission of a unicast packet, ADDRESSEE will be set to the destination address. For the transmission of a multicast packet, ADDRESSEE will be set to the source address. A node is required to eject a packet from the ring if ADDRESSEE matches the address of the node. UM (unicast/multicast) is a 1-bit field used to indicate whether the packet is unicast or multicast. PH (phase) is a 2-bit field with a dual purpose; as described more fully below, PH indicates the priority of the packet and also contains a simple time-to-live mechanism. P (parity) is a 1-bit field used to set the parity of the optical MAC header (approximately 2 bytes), and will be used in combination with 'on the fly' parity checking to provide some header integrity.

The reading of the optical MAC header must be performed 'on the fly' using very simple high-speed logic operations. For ultra-high-speed optical implementation, processing based on simple optical logic gates, such as AND, will be used. Various methods of timing recovery based on self-synchronisation are described in our patent EP-B-687370. For example, the field SS could consist of 2 return-to-zero format optical pulses separated by 1.5 bit periods, and self-synchronisation would be based on the output from an optical AND gate whose first input is a copy of the packet and the second input is a further copy of the packet delayed by 1.5 bit periods with respect to the first. The output from the AND gate is an optical pulse in precise synchronism with the start of the packet. This pulse (which we term here the 'timing pulse') can then be used for a variety of operations on the fly. The timing pulse may be used in the process of determining whether there is a match between ADDRESSEE and the address of the node, as described in our patent EP-B-687370. The timing pulse may also be used in combination with optical AND gates to read the fields UM and PH.

Figure 11:
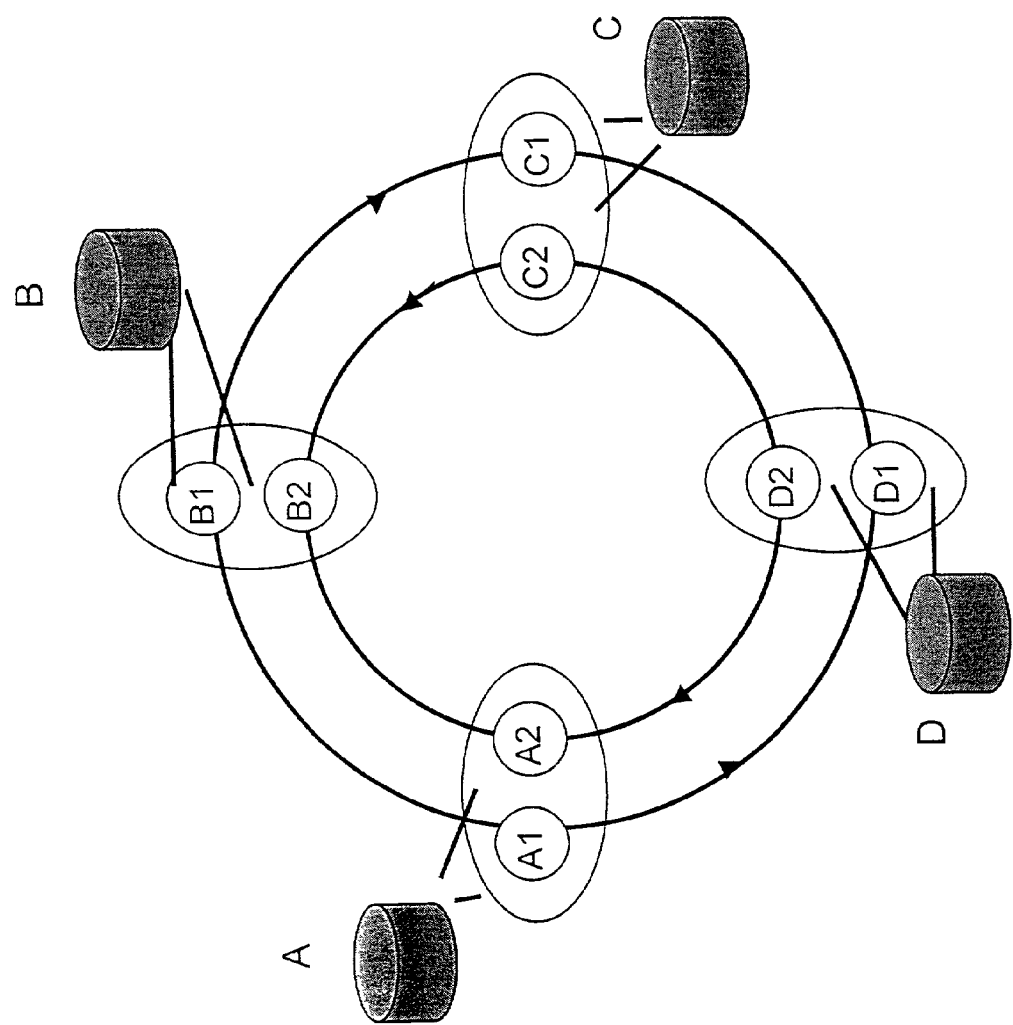
FIG. 11 shows the use of dual addresses.
Figure 12:
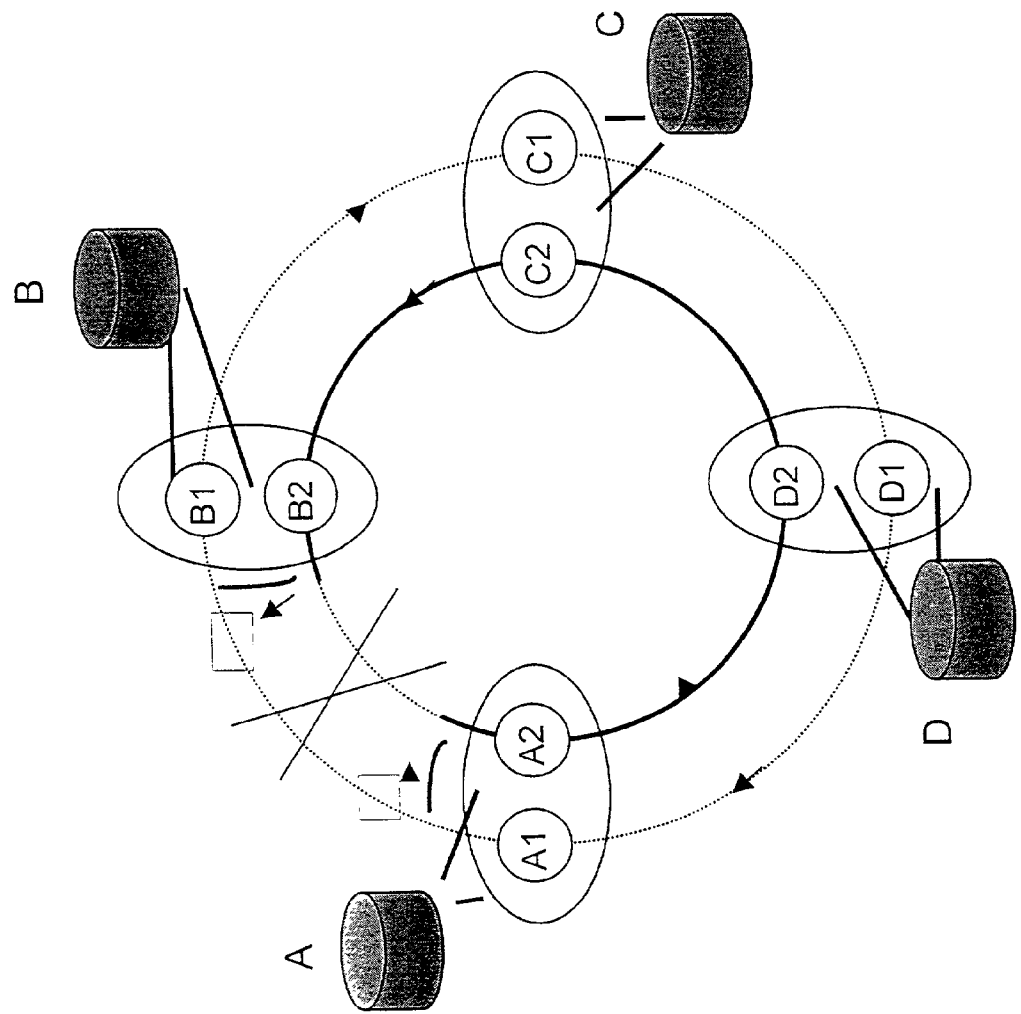
FIG. 12 shows a ring-wrap operation.

The dual ring structure is resilient because, in the event of an isolated fibre break or node failure, the nodes can perform the 'ring wrap' operation illustrated in FIG. 12 [as described for example in Cisco's recently published white paper on Dynamic Packet Transport Technology and Applications]. For proper operation for the control mechanisms which allow the network to reconfigure and re-establish after ring wrap, it is clearly necessary for the nodes to distinguish between those incoming packets which are traveling on their 'correct' ring and those that have been wrapped onto their 'wrong' ring. Here we propose the technique of 'dual addressing' to avoid the need for an additional header field to indicate the 'correct' ring for each packet. Dual addressing is illustrated in FIG. 11. Rather than provide each node with a single address, it is proposed to provide each node with two addresses, one for each of the rings. In this case, the transmitter of a packet uses the appropriate value of ADDRESSEE corresponding to the ring that is being used. In the event of ring wrap, the usual rule for packet stripping is simply followed (a node is required to eject a packet from the ring if ADDRESSEE matches an address of the node), without the need to read further header fields to check whether the packet has been wrapped onto the 'wrong' ring.

Some network control operations require point-to-point signalling between adjacent nodes. This can be done in a number of ways: creation of an independent control packet; 'piggy-back' technique such as overwriting certain fields in a newly created data packet or in a low-priority transit packet; or out-of-band signalling. Out-of-band signalling could be performed in time guard bands between packets.

Figure 13:
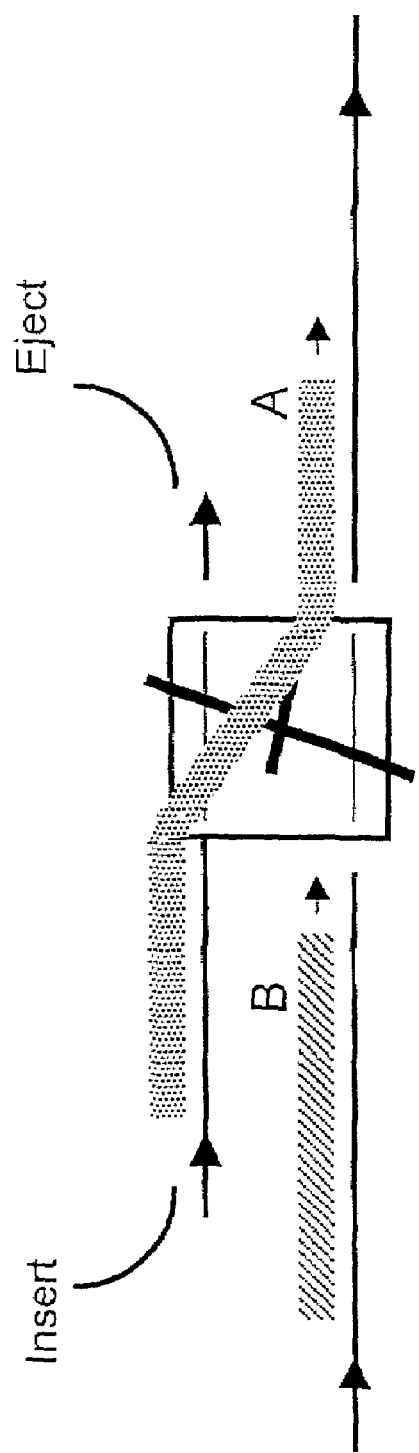
FIG. 13 shows contention at a node output.

A potential limitation of the CEI node architecture is the possibility of contention at the eject-and-insert switch. This is illustrated in FIG. 13. Contention may arise when an incoming packet B arrives when the switch is in the cross position and the node is in the process of inserting a packet A. In the absence of an optical buffering mechanism, various possibilities for contention resolution are available including switch over to the bar state to allow B to pass, thus forcing the ejection of part of A. Resend A later. The recipients of A will recognise that the packet has been truncated, and discard it.

Figure 15A:
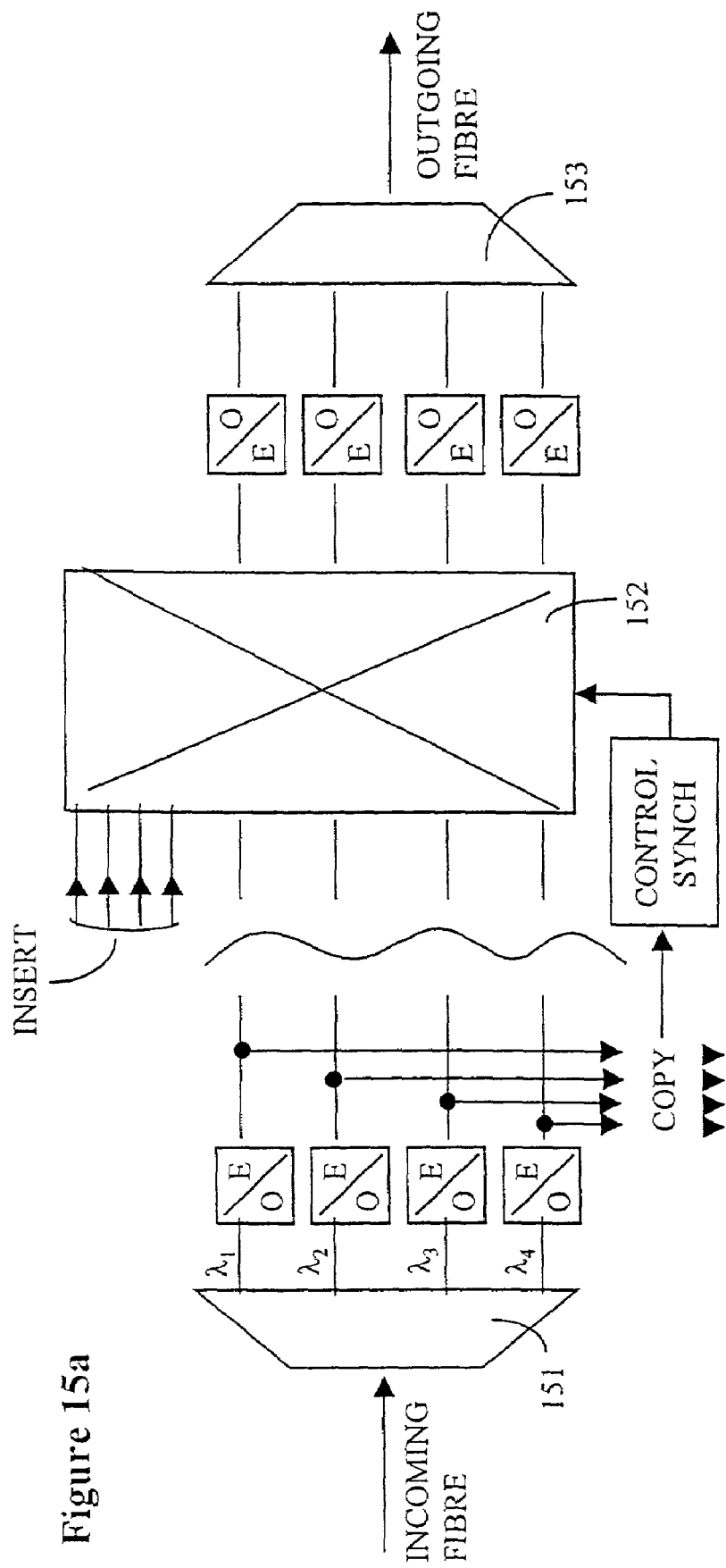
FIG. 15a shows the structure of a node used to switch wavelength division multiplexed optical packets.
Figure 15B:
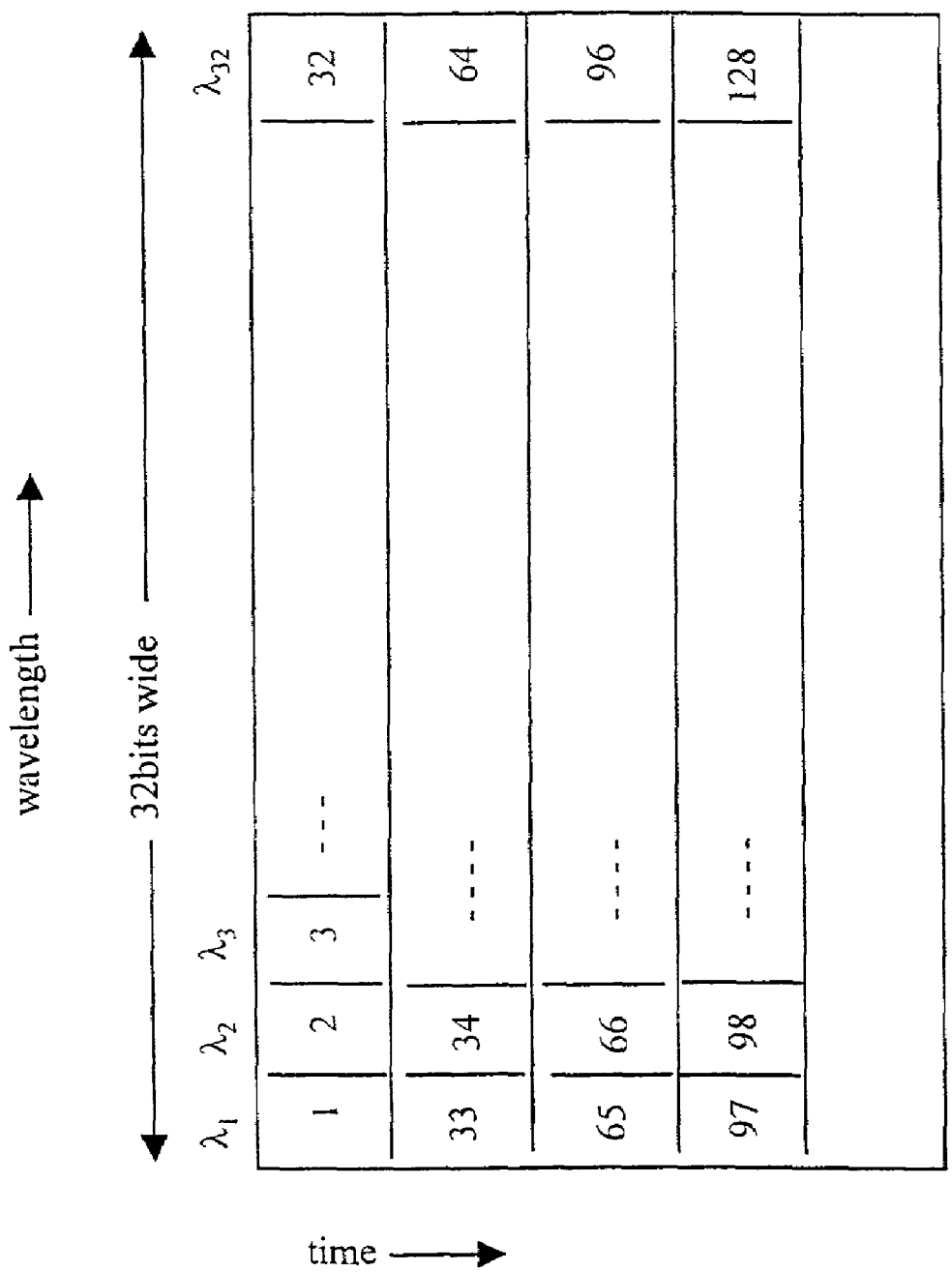

A node embodying the present invention may also be used in a network employing wavelength division multiplexing. FIG. 15a shows one example of such a node. A wavelength division multiplexed packet on the incoming fibre passes to a wavelength division demultiplexer 15. Suitable wavelength division multiplexers are available commercially and may be formed, for example, from wavelength-selective optical couplers or from a fibre Bragg grating. The demultiplexer 151 outputs different wavelength channels on different output fibres. For ease of illustration, only four wavelength channels, $\lambda 1$-$\lambda 4$ are shown, but in practice, a greater number of wavelength channels, for example 8, 16 or 32 channels may be used. The optical signal on each wavelength channel is passed through an opto-electronic converter, such as a photodiode, and is converted to a signal in the electrical domain. The outputs from the opto-electronic converters are tapped to provide the copy of the packet. The copy may be passed to the host receive queue and to control/synchronisation circuits, as described previously in relation to the other embodiments. The outputs of the opto-electronic converters are also connected via an electrical continuous-flow path to the input of an electronic switch 152. A parallel datastream of signals to be inserted into the flow path are also input to the switch 152. The parallel outputs of the switch 152 pass through electro-optic converters and are converted back into the optical domain at different respective wavelengths $\lambda 1$-$\lambda 4$. The signals at the different wavelengths are combined onto the outgoing fibre by an optical multiplexer 153. FIG. 15b shows the format of the optical packets as received on the incoming fibre and as output on the outgoing fibre. In this example, 32 wavelengths are used and the packets are 32 bits wide in the wavelength domain. Bit positions 1, 33, 65, . . . are received at wavelength $\lambda 1$, bit positions 2, 34, 66, . . . at wavelength $\lambda 2$, and so on. In the node, in the input fibre prior to demultiplexing of the WDM packet, the optical signals may be passed through a dispersion-compensating device, such as a length of dispersion-compensating fibre, to realign the different wavelength channels in the time domain so as to correct for the effects of group-velocity dispersion in the optical network.

What is claimed is:

1. A communications system including a communications network, the communications network comprising:
   a ring topology with at least two duplicate ring transmission paths;
   a plurality of nodes connected to the plural ring network, each node being arranged to output onto one of the ring transmission paths packets addressed to one or more other nodes on the network using a packet address field containing a node address unique to the ring transmission path being used; and,
   a switch bridging the at least two transmission paths, and arranged in the event of a failure in one of the transmission paths, to divert packets from the said one of the ring transmission paths onto another of the ring transmission paths,
   each node being assigned a different network address for each of the plural transmission paths, and one or more of the nodes being arranged to remove a packet from the network when the packet carries a node address corresponding to anyone of said plural different network addresses for said one or more of the nodes,
   wherein at least one of the nodes has:
   (a) an input arranged to receive packets from the network,
   (b) an output arranged to output packets onto the network,
   (c) a switch arranged selectively to remove packets from the network, and to insert the packets into the network, and
   (d) a control structure arranged to determine a priority assigned to a transit packet arriving at the node, and arranged to control the switch to remove a transit packet determined to have a low priority, and to insert in the vacancy created by removing said packet another packet determined to have a high priority.

2. A communications system according to claim 1, in which the system is an optical communications system.

3. A communications system according to claim 1, in which each node includes a cyclical continuous-flow transmission path arranged between an input and an output thereof.

4. A communication system as in claim 1 wherein each node which removes a packet from the network also determines from the packet address field whether it arrived on its respectively corresponding originally assigned ring transmission path.

5. A method of operating a node in a communications system, the communications system including a communications network having a ring topology, the communications network comprising at least two duplicate ring transmission paths; a plurality of nodes connected to the plural ring network, each node being arranged to output onto one of the ring transmission paths packets addressed to one or more other nodes on the network using a packet address field containing a node address unique to the ring transmission path being used; and, a switch bridging the at least two transmission paths, and arranged, in the event of a failure in one of the transmission paths, to divert packets from one of the transmission paths onto another of the ring transmission paths, said method comprising:
   assigning a different network address to each node for each of the plural transmission paths;
   removing a packet from the network at a node when the packet carries a node address corresponding to any one of said plural different network addresses for said node,
   receiving a transit packet at a node,
   determining a priority assigned to the transit packet, and when the transit packet is determined to have a low priority then removing the said transit packet, and in that case, outputting from the node, in the vacancy created by said removed packet another packet determined to have a high priority.

6. A method according to claim 5, in which the node includes a continuous-flow transmission path connecting the input to the nodes to the output from the node, and the method includes outputting a transit packet determined to have a high priority via the continuous transmission path.

7. A method according to claim 5, in which the transit packet is received at the node in the optical domain.

8. A method according to claim 5, in which the transit packet is received at the node in the optical domain and in which the continuous-flow transmission path is an optical transmission path.

9. A method according to claim 5, including the step of placing a transit packet determined to have a low priority in a queue at the node, and subsequently outputting the said transit packet from the queue onto the network in a time position later than the position originally occupied by the said transit packet.

10. A method according to claim 5, in which the transit packets are variable length packets.

11. A method according to claim 5, in which the nodes operate synchronously at the packet-level and asynchronously at the bit-level.

12. A method as in claim 5 wherein each node which removes a packet from the network also determines from the packet address field whether it arrived on its respectively corresponding originally assigned ring transmission path.

* * * * *